United States Patent [19]

Bahlke

[11] 3,896,841
[45] July 29, 1975

[54] CONSTANT WEIGHT-CONSTANT DIMENSION COUPLING ASSEMBLY FOR MARINE LOADING ARMS

[75] Inventor: Allan R. Bahlke, Placentia, Calif.

[73] Assignee: FMC Corporation, San Jose, Calif.

[22] Filed: Mar. 21, 1974

[21] Appl. No.: 453,653

[52] U.S. Cl. .................. 137/271; 137/615; 141/84
[51] Int. Cl. ........................... F16l 3/00; B65g 67/00
[58] Field of Search .......... 137/798, 799, 615, 580, 137/616.5, 279, 276, 269, 271; 251/90, 149.8; 248/280, 279, 292; 222/176; 285/64, 276, 337, 12; 141/387, 84, 392, 388, 383, 284

[56] References Cited
UNITED STATES PATENTS

| | | | |
|---|---|---|---|
| 1,177,512 | 3/1916 | Gray | 137/279 |
| 1,293,753 | 2/1919 | Gibson | 137/269 |
| 2,922,446 | 1/1960 | Sheiry | 141/388 |
| 2,927,607 | 3/1960 | Bily | 137/615 |
| 3,249,121 | 5/1966 | Bily | 137/615 |
| 3,455,333 | 7/1969 | Bily | 141/387 X |
| 3,498,325 | 3/1970 | Ashton | 141/387 X |
| 3,651,832 | 3/1972 | Meyer | 137/615 |
| 3,805,834 | 4/1974 | Bily | 137/615 |

Primary Examiner—Martin P. Schwadron
Assistant Examiner—Robert J. Miller
Attorney, Agent, or Firm—C. E. Tripp; W. W. Ritt, Jr.

[57] ABSTRACT

A coupling assembly for marine loading arms and similar types of fluid transferring apparatus, comprising three pipe swivel joints interconnected by pipe elbows, an annular weight-dimension simulator that has the same weight and axial dimension of a butterfly or other type of valve for controlling flow through the assembly, and an adjustable counterweight mounted on the assembly for maintaining the end flange of the assembly in a vertical or other desired attitude to simplify coupling the arm to a marine tanker manifold flange. The valve weight-dimension simulator and the valve it is designed to simulate can be interchanged without changing the overall weight or dimensions of the coupling assembly, and thus without upsetting the balance of the loading arm. The assembly can be provided with a quick connect-disconnect coupler for coupling the arm to the manifold flange of a marine tanker, and the assembly's counterweight can be adjusted to compensate for this added weight and thereby assure that the assembly's end flange remains vertical.

18 Claims, 5 Drawing Figures

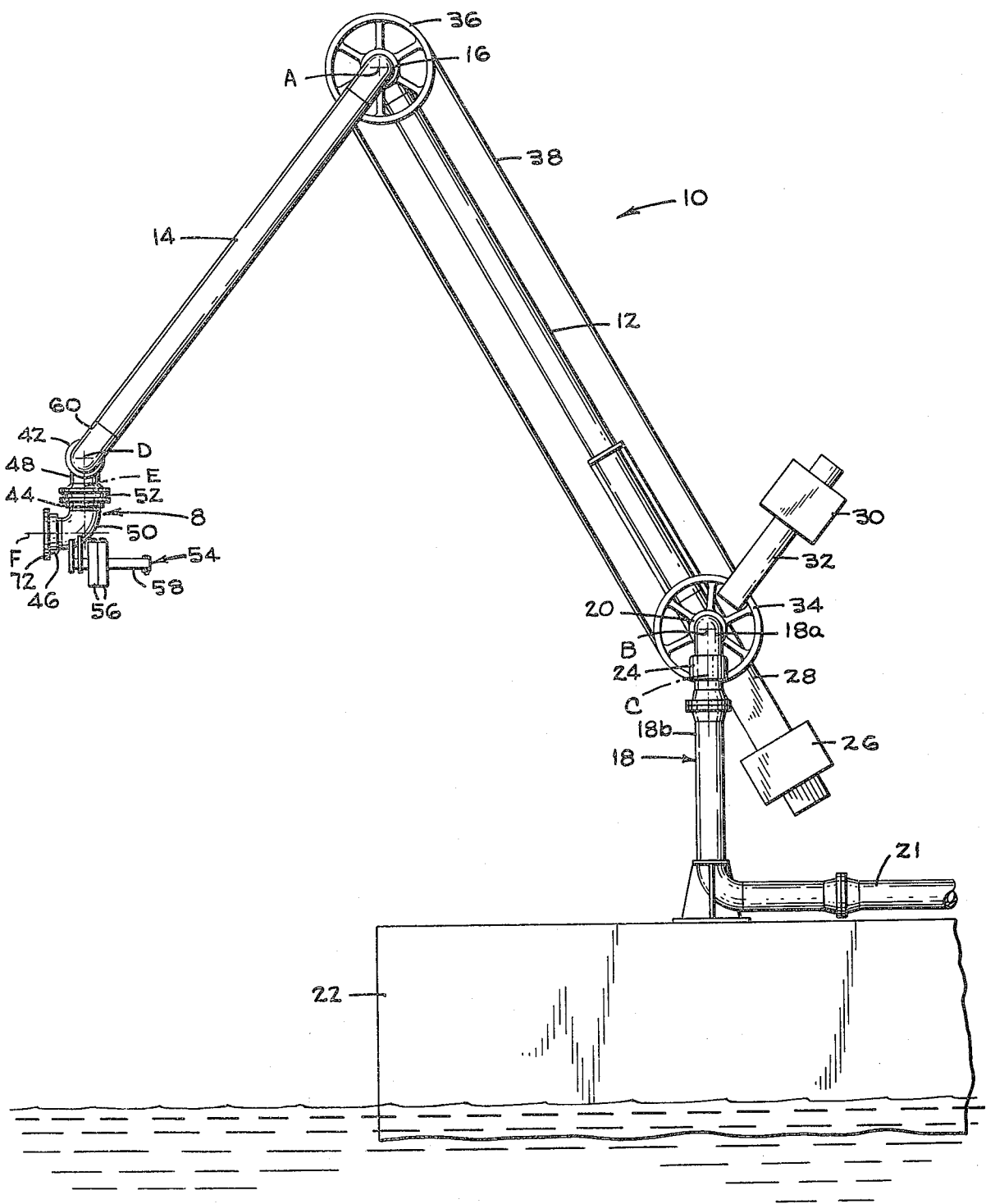
FIG_1

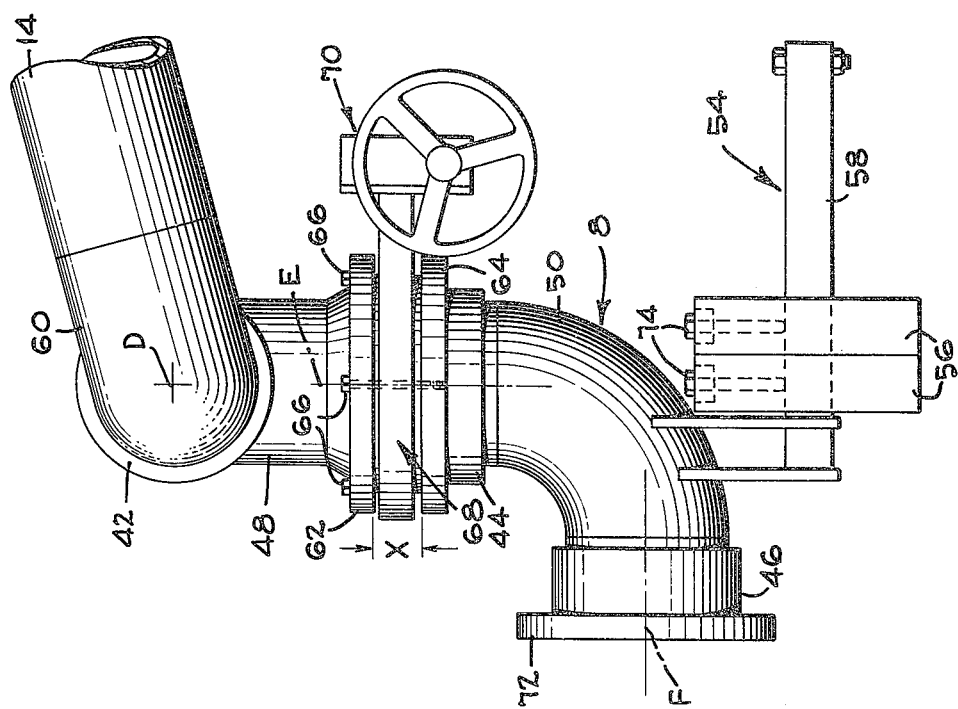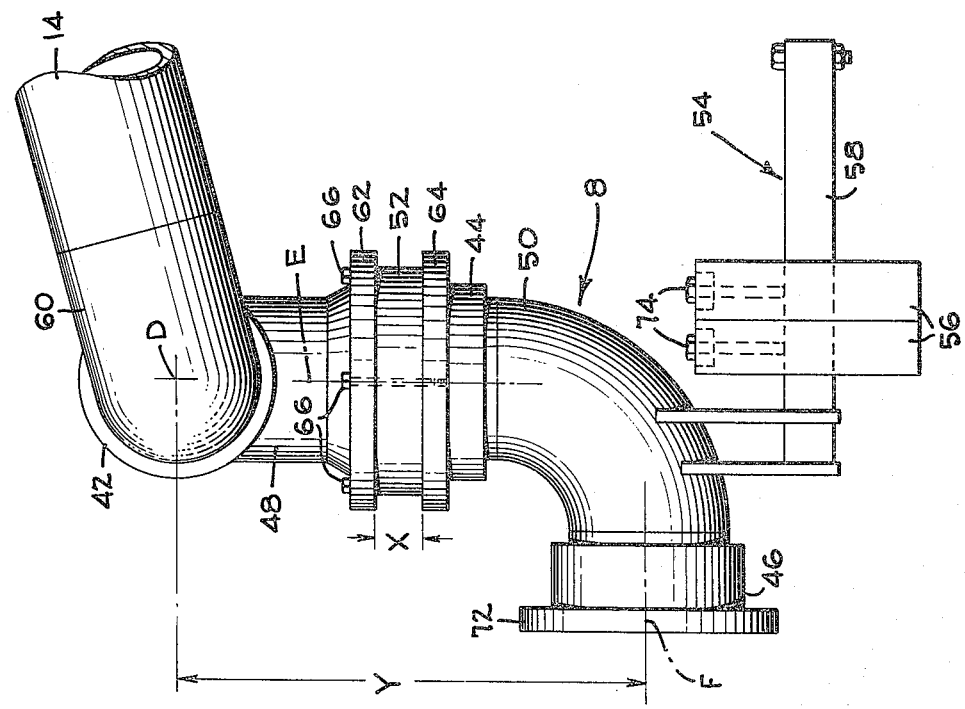

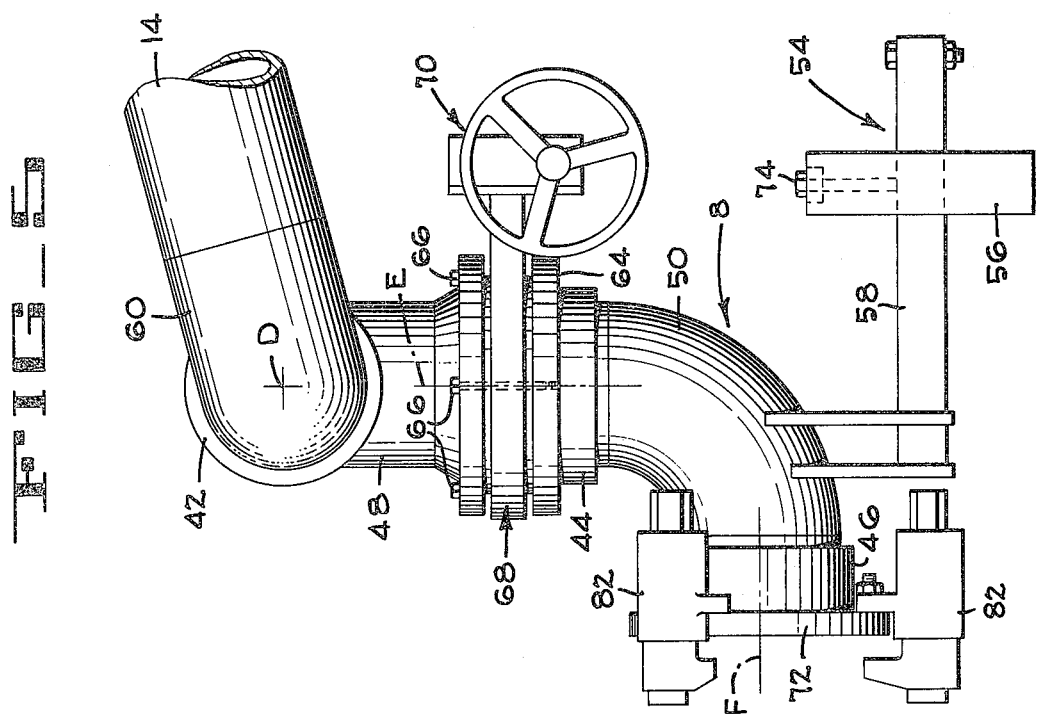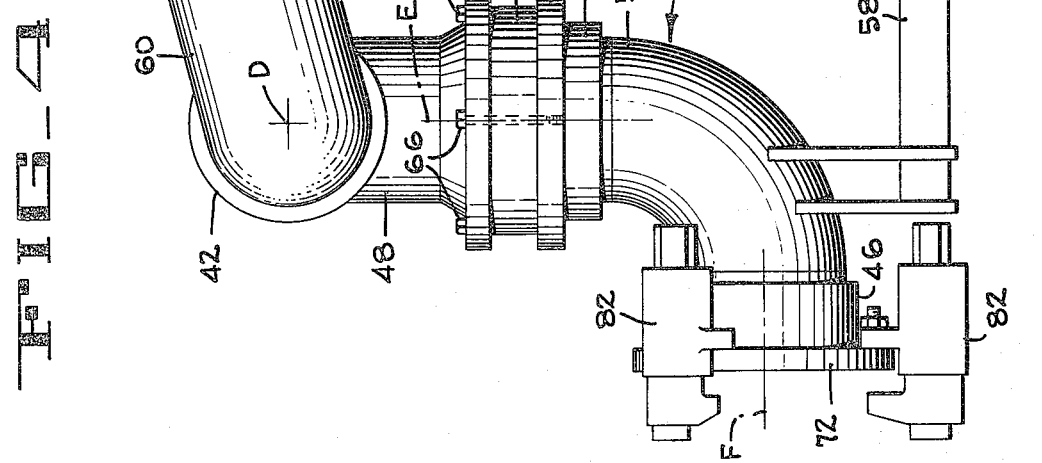

CONSTANT WEIGHT-CONSTANT DIMENSION COUPLING ASSEMBLY FOR MARINE LOADING ARMS

BACKGROUND OF THE INVENTION

Field of the Invention

The present invention relates to coupling assemblies for releasably connecting marine and similar type loading arms to the manifolds of marine tankers, railway tank cars, highway tank trucks, and other fluid cargo transport vessels. More particularly, the present invention relates to such coupling assemblies comprising three pipe swivel joints interconnected by pipe elbows and having means to maintain the end flange of the assembly in a vertical or other desired attitude during all operating conditions.

Fluid loading arms are widely used throughout the world as a highly satisfactory means for transferring petroleum and its products, as well as various other liquids, between a reservoir and a transport vessel, such as a marine tanker, a railroad tank car, or a highway tank truck. A loading arm generally comprises two, or sometimes more, sections of pipe pivotally joined end to end through elbows and swivel joints, and the arm usually is pivotally mounted at its inner end on a riser or other supporting pipe or conduit. An arm of this type employed in marine service commonly has a swivel joint-pipe elbow coupling assembly at its outer end to provide for universal movement between the arm and the tanker when the two are connected together. This assembly often is equipped with a pipe flange coupler to facilitate connecting the arm to the tanker's manifold, and in many instances also with a butterfly valve to control fluid flow through the assembly. The arm, including the coupling assembly, is counterbalanced about a horizontal axis at the riser by a system of counterweights that requires precise engineering to function satisfactorily, especially when large arms such as those of 24 inch diameter and 100 feet reach are involved.

By nature, marine arms are very sensitive to weight change at their outer end, especially those counterbalanced with a single counterweight. Of course, this sensitivity increases with an increase in the distance between the end of the arm and the riser, so that these arms must be re-balanced whenever any significant change in weight occurs at their outer ends, as when a coupler or valve is added to or removed from the coupling assembly. In many instances the arm is installed and counterbalanced without a valve or coupler at its coupling assembly, and later when the arm is equipped with either or both of these devices the increase in weight or moment load is significant, necessitating re-engineering the counterbalancing system to compensate for it.

Although it is a known practice to employ a small, adjustable counterweight on the terminal elbow of the arm's coupling assembly for maintaining the face of the elbow's end flange in substantially vertical attitude to facilitate easier coupling to a tanker's manifold, prior to the present invention this coupling counterweight has been limited to just that function. Therefore, when a valve or coupler device was later installed or removed, the change necessitated rebalancing the entire arm, which of course requires a major engineering effort.

SUMMARY OF THE INVENTION

The present invention comprises a swivel joint-pipe elbow coupling assembly for use on the outer end of a marine or other loading arm, including a weight and dimension simulator for a butterfly or other type of flow control valve which simulator can be replaced easily and readily by the valve without any change in the total weight or dimension of the assembly, and thus without any need to rebalance the loading arm on which the assembly is installed. In its simplest form, the valve weight-dimension simulator may comprise a simple annular or ring-like element having an axial dimension equal to the axial dimension of the valve which it is designed to simulate, and of course, having a weight equal to that valve and, if included, a suitable gear or other type of valve operator. The weight-dimension simulator can be positioned between the opposed flanges in the coupling assembly that accommodate the valve, thereby facilitating substitution of the simulator for the valve, or vice versa, as desired without need for further disassembly of the coupling assembly or other elements of the loading arm. This allows the loading arm to be supplied with or without a flow control valve in its coupling assembly, and yet enables the user to add or remove a valve later without upsetting the arm's balance, and thereby eliminating any need for readjustment of the counterbalancing system.

In its preferred form, the swivel joint-pipe elbow coupling assembly of the present invention also includes its own counterbalancing system comprising a counterweight that is adjustably positioned on a generally horizontal beam or like support secured to the final pipe elbow of the assembly, which counterweight can be easily and readily positioned on its supporting beam to adjust the face of the elbow's end flange into a vertical attitude, whether or not the assembly is equipped with a coupler device for coupling the arm to a tanker manifold. If a coupler is present, the counterweight can be suitably positioned on the support beam so that the weight of the coupler is counterbalanced and the end flange of the terminal elbow is in the vertical position. If the coupler is removed from the assembly the weight of the counterweight is increased in an amount equal to that of the coupler, and repositioned on its support beam until the elbow's end flange is vertical. Furthermore, any change in moment about the horizontal axis through the swivel joint that connects the coupling assembly to the loading arm resulting from interchanging the weight-dimension simulator and the valve can be easily compensated by correct positioning of the counterweight. Thus, the swivel joint-pipe elbow coupling assembly of the present invention has the same weight whether or not it includes a valve and/or coupler, and the face of the assembly's end flange is always in the preferred vertical attitude.

The combination of these two features of the invention provides a swivel joint-pipe elbow coupling assembly with a degree of flexibility that far exceeds any coupling assembly heretofore available. The weight-dimension simulator concept behind this invention can of course be carried further to include other accessories if the need should arise. As a result, loading arms now can be designed for accepting a wide variety of valves, couplers, and other devices without necessitating any later change in their counterbalancing system thereby providing valuable advantages from the standpoint of modification practicality as well as engineering expense.

One object of the present invention is to provide an improved type of swivel joint-pipe elbow coupling assembly for marine and other types of fluid loading arms.

Another object of the present invention is to provide a means for maintaining the weight and the dimensions of a terminal swivel joint-pipe elbow coupling assembly on a fluid loading arm constant when a flow control valve and/or coupler are later installed or removed.

Another object of the present invention is to provide a quick and easy means for adding a flow control valve to, or removing it from, a swivel joint-pipe elbow coupling assembly on a marine loading arm without having to adjust or otherwise change the counterbalancing system for the arm.

Yet another object of the present invention is to provide a means for adding a coupler to, or removing it from, a swivel joint-pipe elbow coupling assembly of a marine loading arm without changing the weight of the assembly, and therefore without need for rebalancing the arm.

Additional objects and advantages of the present invention will become apparent from the following description thereof, taken in conjunction with the accompanying drawings.

BRIEF DESCRIPTION OF THE DRAWINGS

FIG. 1 is a diagrammatic side elevation of a double counterbalanced marine loading arm equipped with a swivel joint-pipe elbow coupling assembly according to the present invention.

FIG. 2 is a side elevation, on an enlarged scale, of the swivel joint-pipe elbow coupling assembly of the present invention as mounted on the outer end of the marine loading arm of FIG. 1, showing the assembly with a flow control valve weight-dimension simulator.

FIG. 3 is a view like FIG. 2, showing the assembly provided with a butterfly flow control valve in place of the valve weight-dimension simulator.

FIG. 4 is a view like FIG. 2, showing the assembly equipped with a coupler for connecting the loading arm to a tanker manifold flange.

FIG. 5 is a view like FIG. 4, showing the assembly equipped with a butterfly flow control valve in place of the valve weight-dimension simulator.

DESCRIPTION OF THE PREFERRED EMBODIMENTS

A swivel joint-pipe elbow coupling assembly 8 according to the present invention, as employed on a marine loading arm 10 designed for use in transferring petroleum or other fluid cargo between a marine tanker and a shore based reservoir or other facility, is diagrammatically represented in FIG. 1. This loading arm 10 comprises an inner pipe section 12, an outer pipe section 14 pivotally connected to the inner section 12 through a swivel joint 16 with a horizontal axis A, and an upstanding riser pipe section 18 on which the inner section 12 is pivotally mounted by another swivel joint 20 with a horizontal axis B. The riser 18 is positioned on a wharf 22, and suitable piping 21 extends from the riser to a reservoir (not shown) for storage of fluid cargo. The upper portion of the riser 18 comprises a 90° elbow 18a that is mounted on the lower straight riser portion 18b through a vertical axis swivel joint 24 to facilitate slewing the arm about a vertical axis C.

A suitable mechanism for counterbalancing the inner and outer pipe sections 12, 14 and the coupling assembly 8 about the horizontal axis B can comprise a primary counterweight 26 mounted on a support beam 28 that is secured to the inner pipe section 12 and extends rearwardly therefrom behind the riser 18. A system for counterbalancing the outer pipe section 14 and the coupling assembly 8 about the horizontal axis A can comprise a counterweight 30, mounted on a beam 32 comprise a sheave 34 that is rotatably mounted about secured to the horizontal axis B for independent rotation with respect to the inner pipe section 12, an outer sheave 36 secured to the outer pipe section 14 and mounted for rotation about the horizontal axis A independently of the inner pipe section 12, and an endless cable or the like 38 interconnecting the sheaves 34, 36. This system for counterbalancing the loading arm 10 is not critical to the present invention, and it should be understood that other types of counterbalancing systems, such as one employing a single counterweight as described in U.S. Pat. No. 3,547,153, issued to Peter J. Bily Dec. 15, 1970, are also suitable.

Broadly considered, the preferred embodiment of the constant weight-constant dimension coupling assembly 8 of the present invention comprises three pipe swivel joints 42, 44, 46 oriented on mutually perpendicular axes D, E and F, respectively, and interconnected by pipe elbows 48, 50. This preferred embodiment also includes a flow control valve weight and dimension simulator 52 removably secured between the elbow 48 and the swivel joint 44, and an adjustable counterweight system 54, comprising one or more counterweights 56 movably secured on a support beam 58 which is fixed to the elbow 50 in a rearwardly extending attitude. This coupling assembly 8 is secured to the outer end of the outer pipe section 14 in the usual manner by a pipe elbow 60 that extends between the swivel joint 42 and the section 14.

As is better observed in FIG. 2, the flow control valve weight and dimension simulator 52 of the coupling assembly 8 preferably is positioned between a pair of opposed pipe flanges 62, 64 that are welded or otherwise secured to the pipe elbow 48 and the swivel joint 44, respectively. The flanges 62, 64 and the simulator 52 can be releasably held together by capscrews 66 that extend through the simulator into threaded holes in the flange 64. Thus, by removing the capscrews 66 the simulator 52 can be removed and replaced by a butterfly or other suitable flow control valve such as that indicated at 68 in FIGS. 3 and 5.

Since the axial dimensions of the simulator 52 and the valve 68 are equal, the space X between the opposed flanges 62, 64 remains unchanged when the simulator and valve are interchanged, and the dimension Y between the horizontal axes D and F through the swivel joints 42, 46 also remains unchanged. Therefore, since the weight of the valve 68 and its simulator 52 are also the same, a constant weight-dimension coupling assembly is achieved by this invention, and the moment load imposed on the outer pipe section 14 remains constant regardless of whether the simulator 52 or the valve 68 is employed. This eliminates any need for having to resize or readjust the position of the counterweights 26, 30.

As stated above, because the weight of the simulator 52 is equal to the weight of the flow control valve 68 the total weight of the coupling assembly 8 does not change when the simulator 52 is replaced with the valve 68, or vice versa. However, due to the unsymmetrical configurations of the valve 68 caused by the extension of its stem and gear operator designated generally at 70 in FIGS. 3 and 5, a downward moment is created on the back side of the assembly 8 (i.e., the side facing the riser 18), and absent a counteracting force this moment would cause it to pivot about the horizontal axis D in a clockwise direction, as viewed in the drawings, until a balance is achieved. This, of course, would cause the flange 72 at the outer end of the assembly 8 to rest in a somewhat tilted up position from the vertical, which tilted up position may not be the most desirable for coupling the loading arm to a tanker manifold. To prevent the flange 72 from moving out of its illustrated vertical position, the counterweights 56 of the coupling assembly's counterbalancing system 54 are repositioned on their support 58 towards the flange 72 until this moment exerted by the valve operator 70 is fully compensated, as is illustrated in FIG. 3. The capscrews 74 extending through the counterweights 56 into engagement with the support 58 are then tightened to hold these counterweights securely in place, and the assembly 8 is then fully balanced and ready for service.

In some loading arm installations it is desirable to isolate the loading arm electrically from the marine tanker, and for this purpose the flanges 62, 64 between which the weight-dimension simulator 52 and the valve 68 are positioned, can be provided with whatever electrical insulation is needed for this purpose.

As has been mentioned above, if desired the coupling assembly 8 of the present invention can be provided with a coupler for securing the loading arm in a fluid-tight manner to the manifold of a marine tanker. For example, and as illustrated in FIGS. 4 and 5, a plurality of rotary clamp-type units 82, such as those described and claimed in the Mezei et al U.S. Pat. Application No. 304,026, filed Nov. 6, 1972, can be suitably positioned on and secured to the assembly's end flange 72, and the additional weight that this incurs can be compensated by removal of one of the counterweights 56 that is sized to constitute an equal weight with that of the combined units 82. The remaining counterweight 56 is then moved on its support 58 into a position where it precisely counterbalances the assembly 8 about the axis D through the swivel joint 42, so that the end flange 72 is again in a vertical attitude. Note that the position of the counterweight 56 on the support 58 will vary when the assembly 8 contains a coupler or clamps 82, depending on whether the assembly contains a weight-dimension simulator 52 or a valve 68. In any case, it now should be clear that by the proper positioning of a single or multiple counterweight 56 on the support 58 the coupling assembly can be exactly balanced about the axis D through the swivel joint 42, thereby showing that the end flange 72 rests in the desired vertical attitude.

It is evident from the foregoing that the present invention provides the very desirable ability to size and adjust the counterweight or counterweights of the loading arm's counterbalancing system so that the arm will always be in the desired state of balance about the horizontal axis B at the riser regardless of which element or combination thereof, as represented in FIGS. 2–5, is employed on the arm. This is possible because of the fact that the weight of the coupling assembly remains constant when a change is made between the four conditions illustrated in FIGS. 2–5, and that the dimension Y between the axes D and F through the swivel joints 42, 46, respectively, does not change. These unique features contribute in a significant manner and extent to improving the versatility of the loading arm on which they are employed, and since they eliminate the need for rebalancing the arm on its riser when, for example, a valve is later inserted in place of the simulator 52, or at a later date the arm is provided with a coupler for connection to a tanker flange, there is no need to rebalance the arm or become involved in other time-consuming, costly efforts to restore the arm to a balanced operable condition.

Although the best mode contemplated for carrying out the present invention has beeen herein shown and described, it will be apparent that modification and variation may be made without departing from what is regarded to be the subject matter of the invention.

I claim:

1. In a fluid loading arm having at least one fluid conducting pipe section supported for pivotal movement about a first generally horizontal axis, and having an outer end for coupling the arm to a fluid conduit of a transport vessel, the improvement comprising a constant weight-constant dimension coupling assembly at the outer end of the arm, said coupling assembly including
   a. a plurality of pipe swivel joints oriented on mutually perpendicular axes,
   b. at least one curved pipe section interconnecting the swivel joints, and
   c. a simulator for a flow control valve, the simulator positioned in the coupling assembly and releasably interconnected therewith at a location that will affect the moment load exerted by the assembly on the loading arm, said simulator comprising a flow conduit whose weight is equal to the total weight of said flow control valve and whose axial dimension is equal to the corresponding dimension of said valve, whereby interchanging the simulator and the complete flow control valve results in no change in the existing conditions that have an effect on pivotal movement of the arm about the first generally horizontal axis.

2. A fluid loading arm according to claim 1 wherein the valve simulator comprises an annular element that, when in place in the coupling assembly, constitutes part of the fluid flow passage through the assembly.

3. A fluid loading arm according to claim 1 wherein at least one of the swivel joints is oriented about a second generally horizontal axis, and wherein the coupling assembly includes a system for counterbalancing said assembly about the second generally horizontal axis.

4. A fluid loading arm according to claim 3 wherein the counterbalancing system comprises at least one counterweight mounted on a support beam.

5. A fluid loading arm according to claim 4 wherein the coupling assembly has a terminal pipe section ending in a flange, and wherein the assembly counterbalancing system is oriented to facilitate control of the attitude of the flange with respect to the vertical.

6. A fluid loading arm according to claim 3 wherein the counterbalancing system facilitates counterbalancing the assembly when the valve simulator has been replaced by a valve, and the valve is unsymmetrical about its flow passage axis.

7. A fluid loading arm according to claim 1 including a coupler mounted on the coupling assembly for connecting the assembly to a transport vessel fluid conduit.

8. A fluid loading arm according to claim 7 including a system for counterbalancing the coupling assembly and the coupler about a generally horizontal axis.

9. A fluid loading arm according to claim 8 wherein the counterbalancing system includes at least one counterweight that is equal in weight to the coupler and that is removable from the counterbalancing system.

10. A constant weight-constant dimension coupling assembly for coupling the outer end of a fluid loading arm to a fluid conduit on a fluid transport vessel, said coupling assembly comprising
   a. a plurality of pipe swivel joints oriented on mutually perpendicular axes,
   b. at least one curved pipe section interconnecting the swivel joints, and
   c. a simulator for a flow control valve, the simulator positioned in the coupling assembly and releasably interconnected therewith at a location that will affect the moment load exerted by the assembly on a loading arm when it is mounted thereon, said simulator comprising a flow conduit whose weight is equal to the total weight of said flow control and whose axial dimension is equal to the corresponding dimension of said valve,
whereby interchanging the simulator and the flow control valve results in no change in the moment load exerted by the assembly on the loading arm.

11. A coupling assembly according to claim 10 wherein the valve simulator comprises an annular element that, when in place in the coupling assembly, constitutes part of the fluid flow passage through the assembly.

12. A coupling assembly according to claim 10 including a system for counterbalancing the assembly about a generally horizontal axis about which one of the swivel joints is oriented when the assembly is mounted on a fluid loading arm.

13. A coupling assembly according to claim 12 wherein the counterbalancing system comprises at least one counterweight mounted on a support beam.

14. A coupling assembly according to claim 13 including a terminal pipe section ending in a flange, and wherein the assembly counterbalancing system is oriented to facilitate control of the attitude of the flange with respect to the vertical.

15. A coupling assembly according to claim 12 wherein the counterbalancing system facilitates counterbalancing the assembly when the valve simulator has been replaced by a valve, and the valve is unsymmetrical about its flow passage axis.

16. A coupling assembly according to claim 10 including a coupler mounted on the assembly for connecting the assembly to a transport vessel fluid conduit.

17. A coupling assembly according to claim 16 including a system for counterbalancing the assembly and the coupler about a generally horizontal axis.

18. A coupling assembly according to claim 17 wherein the counterbalancing system includes at least one counterweight that is equal in weight to the coupler and that is removable from the counterbalancing system.

* * * * *